United States Patent

[11] 3,614,303

[72] Inventor Gerhard Krause
Darmstadt, Germany
[21] Appl. No. 778,515
[22] Filed Nov. 25, 1968
[45] Patented Oct. 19, 1971
[73] Assignee Fernseh GmbH
Darmstadt, Germany
[32] Priority Nov. 12, 1965
[33] Germany
[31] F 44 422
Continuation-in-part of application Ser. No. 507,997, Nov. 12, 1965, now abandoned.

[54] ARRANGEMENT FOR CORRECTING TIMING ERRORS IN COLOR TELEVISION SIGNALS
11 Claims, 8 Drawing Figs.

[52] U.S. Cl. ........ 178/5.4 R
[51] Int. Cl. ........ H04n 9/02
[50] Field of Search ........ 178/5.2, 5.4, 69.5 DC

[56] References Cited
UNITED STATES PATENTS

| | | | |
|---|---|---|---|
| 3,141,926 | 7/1964 | Newell | 178/69.5 DC |
| 3,384,707 | 5/1968 | Boff et al. | 178/69.5 DC |

*Primary Examiner*—Richard Murray
*Attorney*—Michael S. Striker

ABSTRACT: An arrangement for correcting timing errors in a color television signal which is reproduced after being stored on magnetic tape. The color television signal is applied to one end of a delay line having a plurality of taps. The other end of the delay line is terminated by a resistor having the characteristic impedance of the delay line. Each tap of the delay line is connected to a separate signal processing circuit. One such signal processing circuit is associated with each tap of the delay line. The signal from a tap of the delay line is superimposed upon a reference signal. A comparison of the tapped signal with the reference signal is made, and when the difference does not exceed a predetermined limit or threshold value, a switch is closed and the tapped signal is transmitted to an adding device which has a single output and an input for each one of the taps of the delay line. Superposition of the tapped signal with the reference signal may be accomplished either through an additive process or a multiplying process.

Inventor:

Gerhard Krause by [signature]

Attorney

Inventor:
Gerhard Krause
by Michael S. Striker
Attorney

Inventor :

Gerhard Krause by Michael S. Striker

Attorney

Inventor:
Gerhard Krause
by Michael S. Striker
Attorney

ARRANGEMENT FOR CORRECTING TIMING ERRORS IN COLOR TELEVISION SIGNALS

This application is a continuation-in-part of application Ser. No. 507,997, filed Nov. 12, 1965, now abandoned.

BACKGROUND OF THE INVENTION

Timing errors in color television signals are caused by mechanical inaccuracies of the video tape recorder. It is possible to measure these errors by comparing the sync pulses and the color synchronizing signal of the signals played back by the VTR and the sync pulses and the synchronizing signal of the studio. This comparison is only possible at the beginning of each TV line. Therefore, the time delay compensating the timing error is held constant during one line and brought to a new value at the beginning of the next line. This invention relates to an apparatus for correcting timing errors by comparing the color synchronizing signals.

The present invention resides in a method and arrangement for correcting timing errors in color television signals particularly those reproduced from magnetic tape.

To achieve precise reproduction of hue information in a color television picture produced by a color television signal, it is essential that the phase of the color subcarrier generator agree with the phase of the color subcarrier oscillation in the signal. This phase agreement must be accomplished with high accuracy if satisfactory reproduction is to be achieved. The color subcarrier generator is synchronized by the color synchronizing signal.

If the hue error is not be be noticeable, the difference in the phase relationship of the two signals should be less than 5° . This phase difference corresponds to a timing accuracy of a few nanoseconds. This timing accuracy is especially absent in the case where the color television signal is reproduced from magnetic tape record. The timing error caused by inevitable variations of the scanning rate may be compensated by electromechanical control devices to the extent that noticeable geometrical distortion or jitter is not visible in the television picture. However, even under such circumstances, the timing accuracy of the television signal does not suffice to provide satisfactory reproduction of the color television picture.

It is known in the art to apply an electronic control in addition to electromechanical control devices for the purpose of increasing the accuracy in the timing of a color television signal and stabilizing the signal, when reproduced from a magnetic recorded means. Such increase in the timing accuracy and stabilization have been accomplished in the art to the extent that variations in hue are no longer apparent. In the conventional arrangement for accomplishing such results, the color television signal is applied to a delay line, the delay of which is varied by means of a control voltage This control voltage is derived from a phase comparison of the color synchronizing signal and a constant color subcarrier oscillation in the form of a reference signal. The control voltage serves, thereby, to decrease the phase differences. The conventional arrangement is based on varying the time delay by varying the capacitance of controllable capacitors of the delay line. The control voltage derived, as described, is used to vary this capacitance of the controllable capacitors in order to vary the time delay. A disadvantage of this conventional arrangement resides in the condition that the total delay of the color television signal must be substantially greater than the required range of variation of the delay time, Furthermore, color television signal suffers from amplitude-dependent phase variations in the delay line.

In the copending Patent Application, Ser. No. 440,090, now Pat. No. 3,384,707, a method for correcting timing errors in a television signal reproduced from magnetic tape, for example, is described. In this method, timing errors are eliminated through the variation of the signal time delay by means of an error signal. The error signal is derived from a comparison of the timing relationship of the synchronizing signal and a reference signal. A signal pulse derived from the synchronizing signal of the television signal, and the television signal are progressively delayed step by step in successive stages. The television signal is taken from that stage which has an output such that the pulse and the reference pulse occur simultaneously. At that stage the delay is equal to the impulse. In an arrangement for carrying out this method the signal which has a timing error is applied to a delay line provided with a number of taps. The signal is taken from that tap of the delay line at which the television signal and the reference signal occur in a coincident manner. In another embodiment of this arrangement, the pulse is derived from the synchronizing signal of the television signal, after the signal has been delayed. Thus, in this arrangement only the television signal has to be delayed.

In the present invention, the timing errors in a color television signal are corrected by delaying the color television signal as a function of the phase difference between the color synchronizing signal and a constant color subcarrier oscillation used as a reference signal. The color television signal is progressively delayed step by step in successive stages and the phase between the color synchronizing signal in the color television signal is compared to the reference signal at each step or stage. The delayed color television signal is taken from that stage at which the phase difference between the color synchronizing signal and the reference signal is below a predetermined magnitude.

In contrast to the conventional method for correcting timing errors in a color television signal, a method of the present invention has the advantage in that the delay of the color television signal need not be greater than the required variation of the signal delay time. In carrying out the objects of the present invention, therefore, a substantially shorter delay line may be used than that in the conventional arrangements. At the same time, the control range may be increased without difficulty to the extent, for example, that it covers the whole period of the subcarrier. Another advantage of the present invention resides in the condition that no locking between the color synchronizing signal and line synchronizing pulses is required. Furthermore, tin the present invention, the frequency response of the television signal does not depend upon the timing error. The present invention, moreover, has the particular advantage of providing a closed control circuit in contrast to the opened control circuit of the conventional arrangements.

SUMMARY OF THE INVENTION

An arrangement for correcting timing errors in a color television signal reproduced from magnetic tape. A delay line having a number of taps, has the color television signal applied to one of its terminals. The other terminal or end of the delay line is terminated by a resistor with characteristic impedance of the delay line. Each tap of the delay line leads to an individual signal processing circuit which determines a phase difference between the color television signal and the color synchronizing signal used as a reference signal. The phase comparison is preformed either additively or multiplicatively by superimposing the delayed color television signal from the tap of the delay line, onto the color synchronizing signal. The phase difference is rectified and averaged and the resulting signal is applied to a threshold circuit. The latter is designed to emit a signal only when its input is less than a predetermined magnitude. This predetermined magnitude is made the permissible value of the phase difference. When the phase difference as determined for any one tap of the delay line is, in actuality, less than the prescribed limit of the threshold circuit, the latter sets a bistable multivibrator circuit to the state which registers this condition of the phase difference. The multivibrator circuit serves as a storage unit which actuates a switch that permits the color television signal to be transmitted from the associated tap of the delay line. The signal processing circuits are interconnected to assure that two signals from two separate taps of the delay line are not tramsmitted simultaneously, in the event that both such adjacent taps have signals within the permitted phase difference.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
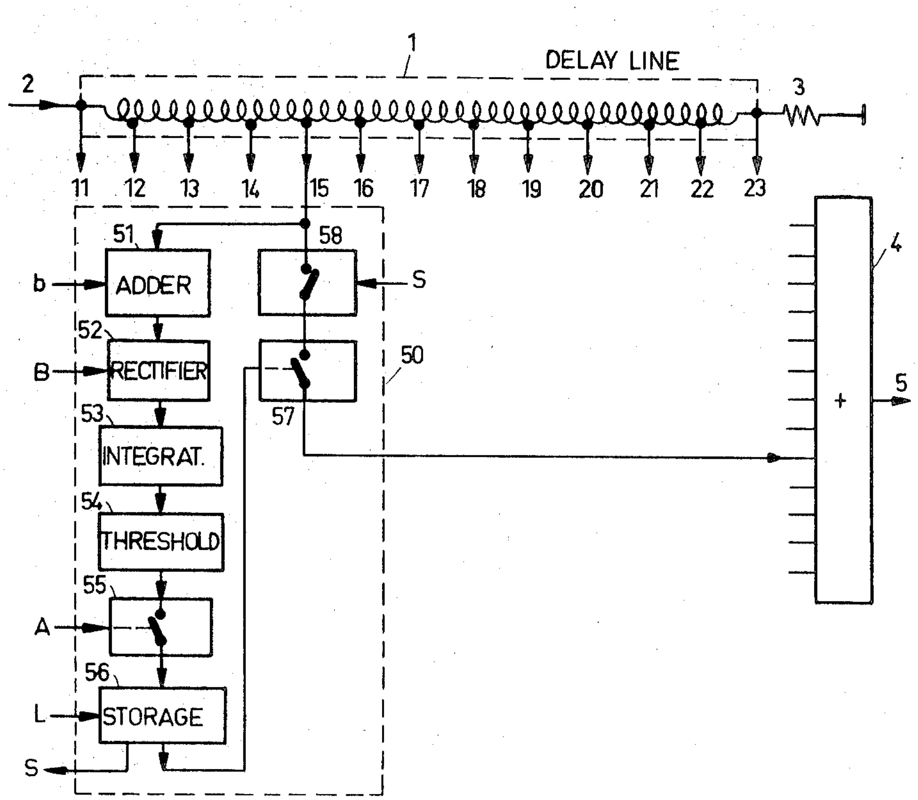
FIG. 1 is a functional schematic diagram and shows the arrangement in which the color synchronizing signal is additively superimposed upon a reference signal for determining the phase difference between these signals, in accordance with the present invention.

Referring to the drawing, a delay line 1 has a number of taps 11 to 23 which are preferably equally spaced along the delay line so that the delay interval between any two adjacent taps is constant. Thus, in such a delay line, the delay interval between taps 11 and 12 is equal to that between taps 12 and 13 or any other two adjacent taps taken along the delay line 1. When the color television signal is applied to the delay line 1 at the input 2, the time interval between signals taken from two adjacent taps corresponds to twice the value of the maximum permissible phase error which is, for example, 5° at a color subcarrier frequency of, for example, 4.43 megacycles per second. The timing error cannot exceed half the time delay between adjacent taps. Therefore, for the purpose of correcting the maximum error of 90°, nine taps are sufficient. In a practical embodiment a larger number of taps may be provided as, for example, 20 . Such a larger number of taps allows for the correction of greater phase errors.

Figure 8:
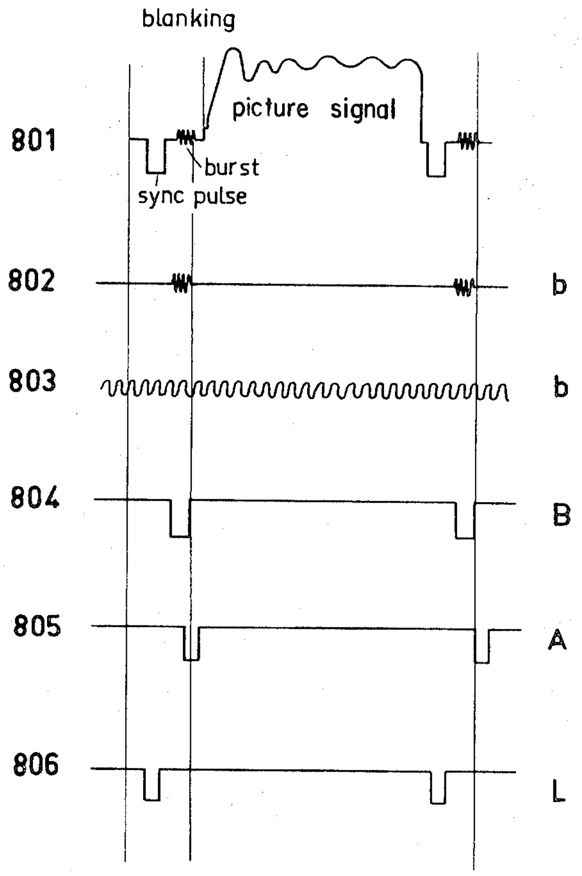
FIG. 8 is a waveform diagram and shows the waveforms of different signals operating in conjunction with the embodiments of FIGS. 1 and 3, in accordance with the present invention.

The output of the delay line is terminated by a resistor 3 having a value which corresponds to the characteristic impedance of the delay line. A separate signal processing arrangement 50 is connected to each tap of the delay line. For purposes of clarity, only one such signal processing arrangement 50 is shown in the drawing of FIG. 1. In a typical signal processing arrangement 50 connected to a typical tap such as tap 15, for example, the color television signal applied to the input 2 is tapped at the respective tape 15, for example, and transmitted to an adder 51 which serves as a phase comparator. In FIG. 8 waveform 801 shows a color television signal composed of the image signal, the sync pulses, the blanking interval, and the burst, This is the signal which is applied to the adder or phase comparator 51. The signal *b* with waveform 802 or 803 is also applied to the adder 51. The waveforms 802 and 803 correspond to the burst and the color subcarrier signal, either one of which is applied as the signal *b* to the adder 51. The signal *b*, in the form of a color subcarrier or a color synchronizing signal, is shifted in phase of 180°. This signal is generated by the central color subcarrier generator of the television studio. Thus, the signal *b* serves as a reference signal derived from the tap of the delay line. The sum of the two oscillatory signals as provided by the adder or phase comparator 51, is transmitted to a rectifying stage 52. This rectifying stage 52 serves to convert the oscillatory signal provided by the adder 51, into a corresponding DC signal. The phase comparison as performed by the adder 51, is to compare only the phases of the burst and the signal *b*. Accordingly, the pulse signal B with waveform 804 is applied to the rectifying circuit 52, to assure that the signal transmitted from this rectifying circuit occurs only for the duration of the burst. The pulse signal b may be derived from the horizontal sync pulses through differentiation and delaying, as well known in the art. This pulse signal B is often referred to also as the K pulse in PAL television studios, and is generated by the central pulse generator which has the timing and the duration of the burst. In this system, the K pulse serves to extract burst signals from the color subcarriers or color television signals.

The output of the rectifying stage is applied to an averaging stage 53 in the form of an integrator. In view of the condition that the phase comparison is being made with oscillatory signals, an averaging process must be applied over several oscillations, in order to obtain meaningful results. Thus, the DC signal as supplied by the rectifying stage 52 is averaged over several oscillations.

The output of the averaging unit 53 is applied to a threshold circuit 54. The latter is a trigger circuit which provides an output signal if the input signal does not exceed the predetermined magnitude. Thus, if the DC signal as supplied by the averaging unit 53 does not exceed the predetermined quantity or magnitude, the threshold circuit 54 is triggered and applies an output signal to the switchins circuit 55. The condition that the DC output of the averaging unit 53 could be below a predetermined magnitude for the purpose of triggering the threshold circuit 54, is met when, for example, the phase difference as obtained by the circuit 51, does not exceed 5°. Expressed in different terms, the threshold circuit 54 becomes triggered when the phase comparison as performed by the adder 51, does not exceed a predetermined quantity or error.

The circuit 55 is a switching circuit or gating circuit operated by a pulse signal A having the waveform 805 shown in FIG. 8. This pulse A may be derived from the pulses B and the sync pulses in a manner well known in the art. After the signal supplied by the threshold circuit 54 is gated by the switching circuit 55, it is applied to the storage unit 56. The storage unit 56 is required for the purpose of storing the information for the duration of an entire television line. Thus, the storage unit 56 retains the applied signal to it until the arrival of the subsequent reference value for one line duration. The operation of the processing circuit 50 remains unaltered if, for example, the switching or gating circuit 55 is connected in front of the threshold circuit 54 rather than after. Thus, from the viewpoint of the storage unit 56, no difference is experienced when the switching or gating circuit 55 is located in either positions in relation to the threshold circuit 54. The reset pulse L applied to the storage unit 56 erases the information at the end of the television line so that the storage unit may be able to store the information for the next or subsequent line. In a manner similar to that regarding pulse A, the reset pulse L having the waveform 806, may be derived from the pulses B and sync pulses, as well known in the art. The output signal from the storage unit 56 is applied to the gating or switching circuit 57 which transmits the delay signal from the delay line 1 to the adding or summing unit 4, provided the switching circuit 58 is also closed. The operation of these two switching circuits 57 and 58 will be described below. Thus, upon the emission of a signal from the storage unit 56, the signal from the respective tap of the delay line is transmitted or applied to the adding unit 4 which provides the output signal 5 of the proper delay. The adding circuit 4 is provided with as many inputs as taps of the delay line, or number of signal processing circuits 50. Accordingly, for each such signal processing circuit 50 the output of this circuit is connected to the adder 4. The latter, however, provides only one output 5 transmitted by that signal processing circuit 50 in which the phase comparison provides a difference below a predetermined magnitude.

Figure 2:
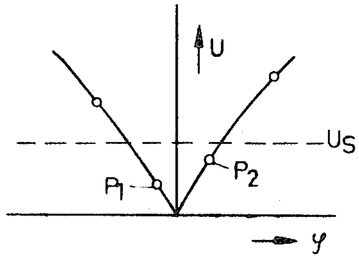
FIG. 2 is a graphical representation of the phase comparison as performed by the embodiment of FIG. 1.

FIG. 2 is a graphical representation of the output voltage of the averaging unit 53, as a function of the phase angle resulting from the comparison. The output voltage of the circuit 53 is noted by U, whereas the phase angle is denoted by L. When, for example, the phase comparison is such that the color synchronizing signal is equal precisely to the reference signal, the phase angle is zero, and accordingly the voltage U is identically zero or at a minimum. Depending upon whether the phase angle is positive or negative, the output voltage U will increase from zero for either negative phase angles or positive phase angles, other than zero, The threshold level $U_s$ as determined from the threshold circuit 54 is represented by the broken line in FIG. 2. The level $U_s$ is the allowable level below which a threshold circuit 54 may emit a signal to the switching circuit 55. Thus, the level $U_s$ represents that level of the output voltage of the averaging unit 53, at which the phase angle from the comparison does not exceed a predetermined magnitude. For example, level $U_s$ may be chosen so that this voltage at the output of the circuit 53 represents a phase difference not exceeding 5°. Through the selection of proper components within the threshold circuit 54, it is possible to adjust the level $U_s$ to any desired magnitude, depending upon the allowable phase difference. The threshold circuit 54 is designed so that it will not emit a signal if the voltage output of the averaging unit 53 exceeds this level $U_s$.

Depending upon the magnitude of the threshold level $U_s$ chosen for the threshold circuit 54, it is possible that two adjacent signal processing circuits 50 respond with phase comparisons or phase differences not exceeding the allowable value dictated by the level $U_s$. Thus, for example, the phase difference as established from one signal processing unit 50 may correspond to the point $P_1$ in FIG. 2. The phase difference as established by a signal processing unit 50 connected to an adjacent tap of the first signal processing unit 50, is denoted by the point $P_1$. It is seen from this relationship, that both phase differences as determined by the two processing signal circuits are within the allowable level established by the signal voltage $U_s$. assure that only one signal from one processing circuit 50 is applied to the adder 4, the signal output S of the storage unit 56 is applied to the preceding adjacent processing unit 50.

Thus, assume, for example, that the signal processing unit 50 connected to the tap 15 in FIG. 1 evaluates a phase difference corresponding to the point $P_1$ in FIG. 2. Assume further that a similar signal processing circuit 50 connected to the tap 16 in FIG. 1 evaluates a phase difference represented essential $P_2$ in FIG. 2. Since both points $P_1$ and $P_2$ are below the allowable error in the phase difference, the outputs of both taps 15 and 16 of the delay line are eligible to be applied to the adder 4. However, it is essential that only one of these two outputs be actually applied to the adder 4. For this purpose, the output signal S from the storage unit 56 in the signal processing circuit 50 connected to the tap 16, is applied to the switching or gating circuit 58 associated with the tap 15. Thus, the storage unit 56 associated with the tap 15 emits a signal S which is applied to the gating circuit 58 associated with the tap 15, and thereby inhibits the signal from tap 15 to be applied to the adder 4. The signal S applied to the switching circuit 58 shown in FIG. 1, therefore, is derived from similar processing signal circuit 50 connected to the tap 16. This signal S when applied to a switching circuit 58 prevents signal flow from the tap 15 to the adder 4, by opening, in effect, the switching or gating circuit 58. In a consistent manner, the signal S emitted by the storage unit 56 associated with the tap 15 is applied to the switching circuit 58 associated with the tap 14. Accordingly, through this specific design and interconnection of the signal processing unit 50 with the signal S, assurance is had that only one signal from a single tap of the delay line is applied at any time to the adder 4.

The switching circuit or gating circuit 55 connected between the threshold circuit 54 and the storage unit 56, is arranged to provide an output signal only when the phase comparison is terminated. For purposes of obtaining a meaningful comparison, approximately 10 oscillations prevail in the burst in the color television signal. At the end of the burst, the measurement of the phase difference is ready and available for applying to the storage unit 56. To assure that the signal is applied to the storage unit 56 at the proper instant of time, the gating pulse A with waveform 805 is applied to the switching or gating circuit 55. This gating pulse A may be derived from the trailing edge of the gating pulse for the color synchronizing signal or the pulse B. Shortly prior to the occurrence of this gating pulse A, all storage units are set to the state in which no tap of the delay line is connected to the adder 4. This is accomplished by applying the reset pulse L to all of the storage units.

Figures 3, 4:
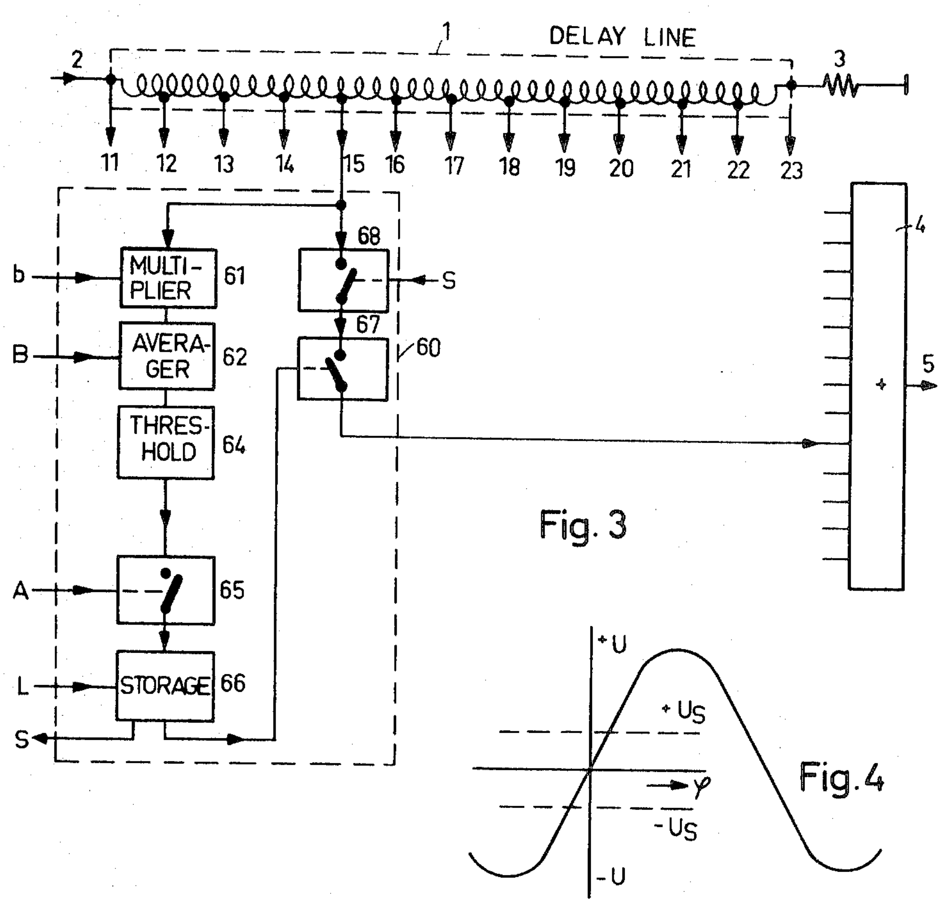
FIG. 3 is a functional schematic diagram of another embodiment of the arrangement of FIG. 1.
FIG. 4 is a graphical representation of the phase comparison as performed by the arrangement of FIG. 3.

FIG. 3 shows an arrangement similar to that described in FIG. 1, in the respect that a delay line 1 is provided with a number of taps, and has a color television signal applied to the input and to the delay line. The output of the delay line is terminated by the resistor 3. Separate signal processing units 60 are connected to each tap of the delay line, and connect, under predetermined conditions, the respective tap output to the adder 4. Thus, each tap 11 to 23 is provided with a separate and individual signal processing circuit 60 which applies the output of the respective tap to the adder 4 for the purpose of supplying a signal output 5. The switching or gating circuits 67 and 68 function in the same manner as described in the relation to the circuits 57 and 58, respectively, in FIG. 1, The essential difference between the arrangement of FIG. 3 and that of FIG. 1 resides in the unit 61 which, in the case of FIG. 3, is a multiplier. This, in stead of performing the phase comparison by superimposing additively the color synchronizing signal and the comparison signal *b* as in FIG. 1, these two signals are superimposed multiplicatively in the circuit 61 of FIG. 3. The average value is obtained of the product of the oscillations in the averaging unit 62. Instead of multiplicative superposition, mutual modulation of the oscillations to be compared, can be effected in a ring modulator or similar arrangement.

FIG. 4 is a graphical representation of the output voltage from the averaging unit 62. As well known in the art, the multiplication of two sine waves of the same frequency, such as the signal *b* and the delay line tap output, results in a sine wave of double the frequency and having an average value which is a function of the phase difference. This average value due to the multiplication of the two AC input signals to the multiplier unit 61, is shown in FIG. 4.

In accordance with the graphical representation of FIG. 4, it is shown that the output signal of the averaging unit 62 varies between positive and negative values from zero. To remain within a predetermined phase difference, the tolerance levels $U_s$ is applied similar to that described in relation to FIG. 2. Due to the oscillatory characteristic of the signal in FIG. 4, however, positive and negative levels for the value $U_s$ are applied. The actual voltage U emitted by the averaging unit 62 has the same meaning as described in relation to FIG. 2. The level $U_s$ is observed by the threshold circuit 64, which will emit the signal to the switching or gating unit 65 only if the absolute level $U_s$ is not exceeded. The switching or gating circuit 65, as well as the storage unit 66, have the same function as the corresponding units 55 and 56 in FIG. 1. It is therefore seen, that the arrangement of FIG. 3 differs from FIG. 1 only in the respect that the phase comparison in FIG. 3 is performed multiplicatively, whereas the phase comparison in FIG. 1 is accomplished additively.

Figure 5:
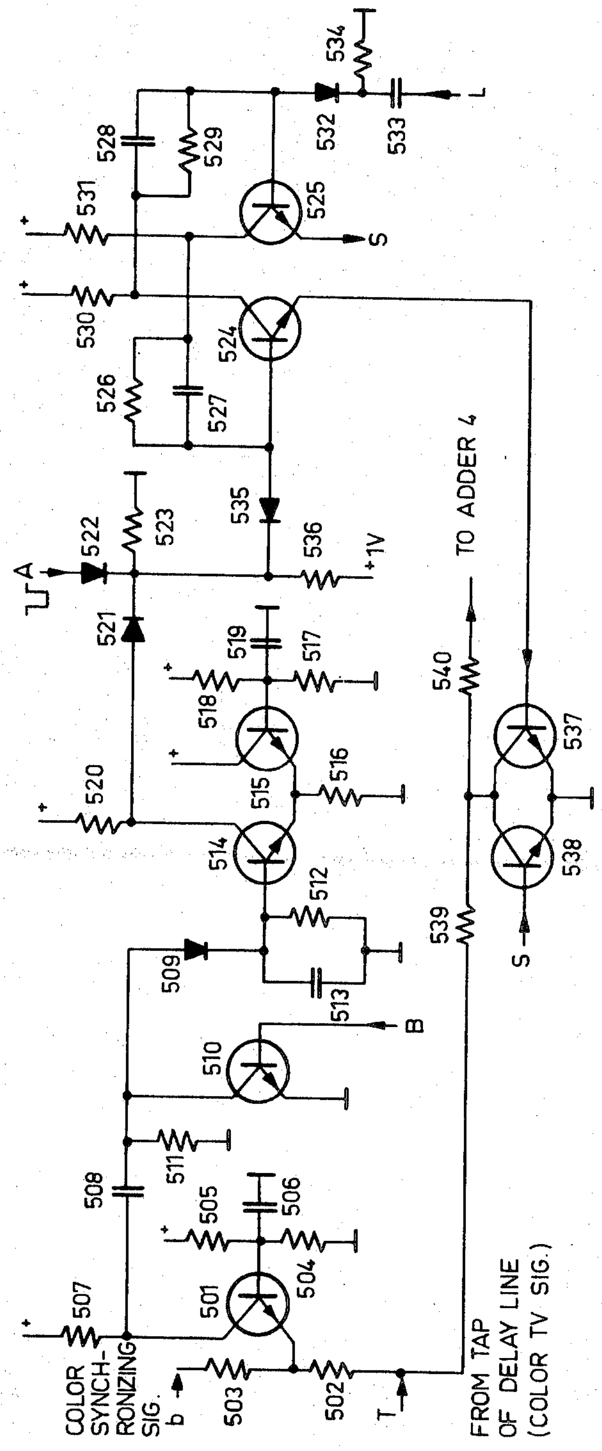
FIG. 5 is an electrical circuit diagram and shows the electronic components and their interconnections for carrying out the phase comparisons and the signal processing in the embodiment of FIG. 1.

FIG. 5 shows an embodiment of a typical processing arrangement 50 in FIG. 1. The color television signal as derived from a tap of the delay line, is applied to the terminal T of the resistor 502. This color television signal is thereby applied to the emitter of a transistor 501, by way of the resistor 502. In a similar manner, the comparison signal or color synchronizing signal *b* is applied to the emitter of transistor 501, by way of the resistor 503. Through this application of the two resistors 502 and 503, in conjunction with the emitter of transistor 501, the two signals are additively applied to the transistor. The base of the transistor 501 is maintained at constant DC level through a voltage divider consisting if resistor 504 and 505, and through a bypass capacitor 506 connected to the tap or junction of the voltage divider. The voltage sum of the two signals applied to the transistor 501, appears at the collector of this transistor, and is transmitted to a rectifier 509, by way of a capacitor 508. The collector of the transistor 501 is connected to the positive terminal of a power supply, by way of the resistor 507. A gating transistor 510 has its collector connected to the junction of the capacitor 508 and the rectifier 509. The pulse signal B is applied to the base of this transistor 510. The emitter of the transistor 510 is connected to ground potential. The gating function takes place only during the currents of the color synchronizing signal, through the application of the pulse signal B having the waveform 804.

The rectifier 509 has its output connected to a resistor 512 which is, in turn, connected to ground potential with its other terminal. A capacitor 513 is connected in parallel with the resistor 512. The rectified voltage signal provided by the rectifier 509, is applied to the base of a transistor 514 which forms a threshold circuit in conjunction with the transistor 515. This threshold circuit is denoted by the unit 54 in FIG. 1. In this threshold circuit, the two emitters of the transistors 514 and 515 have a common emitter resistor 516 leading to ground potential. The base of the transistor 515 is maintained at the appropriate DC level, through the voltage divider consisting of resistors 517 and 518, as well as the bypass capacitor 519 connected to the base of the transistor 515 and the junction of the voltage divider. The output of the threshold circuit appears at the collector of the transistor 514 which leads to the positive terminal of the voltage power supply by way of the resistor 520. Any signal output of the threshold circuit appearing on the collector of the transistor 514 is transmitted to the circuit only provided the gating pulse signal A is present. For the purpose of imposing this condition that the signal from the threshold circuit is transmitted only in case of the presence of the pulse signal A, an AND circuit is provided. This logical AND circuit consists of the two diodes 521 and 522 joined together to the output resistor 523. This output resistor has one terminal connected to ground potential. The gating pulse A as previously described, is derived from the trailing edge of the burst gating pulse B for the color synchronizing signal. The storage unit 56 in FIG. 1 is constructed of a bistable multivibrator circuit having two transistors 524 and 525 with associated components 526 to 531. These components consist of combinations of resistors and capacitors consist of combinations of resistors to form the multivibrator, as well known in the art. Thus, and RC circuit of resistor 526 and capacitor 527 is connected between the base of transistor 524 and the collector of transistor 525. Similarly, the RC circuit of resistor 529 and capacitor 528 is connected between the base of transistor 525 and the collector of transistor 524. Resistors 530 and 531 serve as collector resistors which connect the collectors of transistors 524 and 525, respectively, to the positive terminal of the power supply. The reset pulse L is applied to the base of the transistor 525, by way of the capacitor 533 and diode 532. The multivibrator circuit has the property, as known in the art, to remain in the state to which it has been set, and thereby store a desired signal, until reset or set to the opposite state. A base resistor 534 is connected between ground potential and the junction of the capacitor 533 and the diode 532, to which the reset pulse L is applied. The emitter of the transistor 525 supplies the signal S which when applied to the switching unit 58 of the preceding signal processing circuit 50, inhibits transmission of the color television signal to the adder 4 from the preceding tap of the delay line. Accordingly, when the transistor 525 is in the state in which the signal S is transmitted from the emitter of this transistor, the condition prevails in which a phase difference signal within the tolerable limits has been emitted by the averaging circuit 53 and stored in the storage unit 56, by way of the threshold circuit 54 and switching unit 55. When the storage unit 56 is this state in which is stores a signal, then an inhibiting signal S is to be transmitted to the previous or preceding circuit 50 for the purpose of preventing the arrival of two separate signals at the adder 4.

The two switches or logic switching circuits 57 and 58 in FIG. 1, are realized through two transistors 537 and 538. When an inhibiting signal S is applied to the base of transistor 538 from the signal processing circuit 50 of the subsequent tap, the transistor 538 is switched to the conductive state. As a result, the junction of resistors 539 and 540 is connected to ground potential through the short circuit existing across the collector and emitter of the transistor 538. Thus, when the junction between resistors 539 and 540 is short circuited to ground, by way of the transistor 538, the color television signal applied to the input T cannot reach the adder 4 from the output terminal of the resistor 540. By applying the inhibiting signal S, in this manner, to the transistor 538, transmission of the color television signal to the adder 4 from any tap of the delay line is prevented when the subsequent or succeeding tap is already or also transmitting to the adder 4.

Transistor 537 serves to prevent transmission of the color television signal from any tap of the delay line, when the phase difference as evaluated by the unit 51 or unit 61, exceeds the predetermined tolerance limit. When such phase difference above the desired limit prevails, the threshold circuits 54 or 64 do not transmit, and the storage unit 56 or 66, as a result, is not set to the opposite state in which it stores a signal signifying that the phase difference is within a desired limit. As a result, the bistable multivibrator circuit of the storage units 56 or 66, remains in the initial state in which transistor 534 is in the state which maintains transistor 537 turned on or in the conductive state. As a result of this condition of transistor 537, the junction between resistors 539 and 540 is again short circuited to ground potential, by way of collector and emitter of transistor 537, and the color television signal from the input T applied by the tap of the delay line is not transmitted to the adder 4. Thus, when the storage unit 56 or 66 is not set to the opposite state by the transmission of a signal from the threshold circuits 54 or 64, the emitter of the transistor 524 applies a potential to the base of transistor 537 whereby the latter is held in the turned on condition. When this transistor 537 is thus turned on, the junction between resistors 539 and 540 is short circuited to ground and as a result, the signal applied to the input T by the delay line is effectively grounded.

The circuit arrangement of FIG. 5 is the detailed construction of the signal processing circuit 50, and one such circuit 50, as shown in FIG. 5, is provided for every tap of the delay line. so that the number of such circuits 50 is equal to the number of taps on the delay line.

Figure 6:
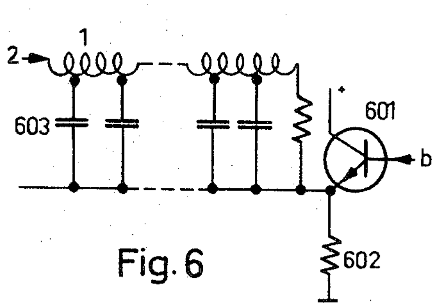
FIG. 6 is a partial electrical circuit diagram and shows an alternate embodiment of FIG. 1 for superimposing the color television signal and the color synchronizing signal for carrying out the phase comparison of FIG. 1.

FIG. 6 illustrates an alternate method for superimposing the color synchronizing signal *b* upon the color television signal. The superposition is accomplished by applying the color television signal to one terminal of the delay line, and the signal *b* to the other end or terminal of the delay line. In this arrangement, therefore, the delay line itself serves as the element which performs the adding is applied adding or superimposing. Thus, the color television signal is applied to one terminal 2 of the delay line as previously. The color synchronizing signal *b*, however, is applied in this embodiment of FIG. 6, to the opposite terminal or end of the delay line which, in FIG. 1, is terminated through the resistor 3. This end of the delay line which is terminated by resistor 3 in FIG. 1 has now applied to it the synchronizing signal *b* through the transistor 61 in FIG. 6. Thus, the terminal of the delay line opposite to the input terminal 2 is connected to the emitter of transistor 601 leading to ground potential by way of the resistor 602. The synchronizing signal *b* is applied to the base of the transistor 601, whereas the collector of this transistor is connected to the positive terminal of the power supply. The transistor 601 is connected as a common collector stage with the resistor 602, and thereby superimposes the synchronizing signal *b* upon the color television signal applied to the input 2 at the opposite end of the delay line 1. Capacitor 603 shown on the delay line in FIG. 6 form the resistance-capacitance couplings of the delay line. The capacitors 603 are symbolic in FIG. 6 to the extent that the capacitance in an actual delay line is inherent through the construction of the delay line. Thus, the resistance-capacitance effects of the delay line is distributed along the length of the line. The embodiment of FIG. 6 is applicable only if the color synchronizing signal of the color television signal is not used for further transmission, or if the signal *b* becomes eliminated subsequently. Thus, the circuit connection of FIG. 6 is only applicable when the color synchronizing signal is readded to the color television signal or if the color synchronizing signal of the pulse generator is subtracted subsequently, for example, by means of a differential amplifier.

Figure 7:
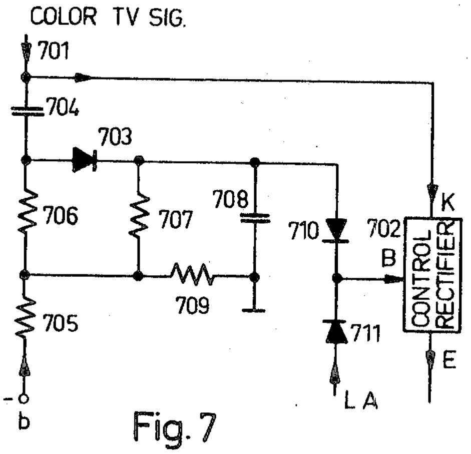
FIG. 7 is an electrical circuit diagram and shows another embodiment for carrying out the functions of FIG. 5.

FIG. 7 illustrates a simplified embodiment of the signal processing circuit 50 or 60 of FIGS. 1 and 3, respectively. A simplified arrangement, shown in FIG. 7, is particularly useful because of the large number of such circuits required for the large number of taps normally prevailing on the delay line. The embodiment of FIG. 7 is an economical design for performing the functions of the signal processing circuits 50 or 60. In this design, the color television signal is applied to the terminal 701, whereas the color synchronizing signal *b* is applied to the resistor 705. The sum of the color television signal and the synchronizing signal is rectified by the diode 703 and applied across the capacitor 708 which provides the average value of the rectified sum. Thus the color television signal as derived from a tap of the delay line is applied to the capacitor 704, by way of the terminal 701. The synchronizing signals *b* reaches the diode or rectifier 703, by way of the resistors 705 and 706. The two signals are thus superimposed upon each other at the input of the rectifier 703. Through the action of the capacitor 708 in conjunction with the resistors 707 and 709, an average value is realized from the rectified sum provided by the diode 703. The resulting average value is applied, by way of the diode 710, to the control electrode of a thyristor or control rectifier 702. The collector K of the thyristor or control rectifier is connected to the terminal 701. The control rectifier or thyristor 702 serves as the threshold circuit 54 or 64 in FIGS. 1 and 3 respectively. The reset pulse signal L and the gating pulse A are applied to the control electrode B, by way of the diode 711. The functions of the circuits 54, 55, 56 and 57 are accomplished through the control rectifier 702, and the diodes 710 and 711.

It will be understood that each of the elements described above, or two or more together, may also find a useful application on other types of constructions differing from the types described above.

While the invention has been illustrated and described as embodied in timing error correcting circuits for color television signals, it is not intended to be limited to the details shown, since various modifications and structural changes may be made without departing in any way from the spirit of the present invention.

What is claimed as new and desired to be protected by Letters Patent is set forth in the appended claims:

1. An arrangement for correcting timing errors in a color television signal comprising, in combination, delay line means having an input end for receiving said color television signal and a plurality of taps from which said color television signal is emitted after predetermined time delays, each of said taps on said delay line means corresponding to a predetermined time delay differing from the time delays associated with the other taps of said delay line means; a plurality of signal processing circuit means each connected to one of said taps of said delay line means and including switching means for transmitting from the output of said signal processing circuit means the color television signal emitted by the tap of the delay line means to which the signal processing circuit means is connected; comparison means connected to the tap of said delay line means and having a reference signal applied to it for comparing the phase of the color television signal from said tap with the phase of said reference signal; and threshold circuit means connected to said comparison means and providing an output signal only when the phase difference between said reference signal and said color television signal is below a predetermined level whereby said switching means responding to said threshold circuit means transmits a signal emitted from a tap of said delay line means and having a desired phase relationship in comparison with said reference signal.

2. The arrangement for correcting timing errors in a color television signal as defined in claim 1, wherein said comparison means comprises an adding circuit for additively superimposing the color synchronizing signal in said color television signal and said reference signal with color subcarrier frequency.

3. The arrangement for correcting timing errors in a color television signal as defined in claim 1, wherein said comparison means comprises multiplying circuit means for multiplicatively superimposing the color synchronizing signal in said color television signal and said reference signal with subcarrier frequency.

4. The arrangement for correcting timing errors in a color television signal as defined in claim 1 including diode circuit means in said comparison means for receiving the color synchronizing signal in said color television signal and said reference signal for comparing said color synchronizing signal to said reference signal; controlled switching means in said threshold means and having a control electrode connected to said diode circuit means, the input of said controlled switching means being connected to the respective tap of said delay line means; and summing means having a plurality of inputs each connected to one signal processing means processing the signal emitted by one tap of said delay line means, said summing means having an output providing a signal representing the corrected color television signal.

5. The arrangement for correcting timing errors in a color television signal as defined in claim 1 including storage means connected to said threshold circuit means for storing a controlled signal for actuating said switching means; and auxiliary switching means connected in series with said switching means and actuated by said control signal from the signal processing circuit means connected to the adjacent tap of said delay line means, whereby said auxiliary switching means inhibits transmission from said switching means when the signal from the adjacent tap of said delay line means is transmitted through and out of the signal processing circuit of said adjacent tap.

6. The arrangement for correcting timing errors in a color television signal as defined in claim 1 including storage means connected to said threshold circuit means for storing a control signal for actuating said switching means; and gating means connected between said threshold circuit means and said storage circuit means and actuated by a gating pulse derived from the trailing edge of the gating pulse for the color synchronizing signal in said color television signal, whereby said color synchronizing signal is applied to said threshold circuit means only upon termination of the comparison process of said comparison means.

7. The arrangement for correcting timing errors in a color television signal as defined in claim 1 including storage means connected to said threshold circuit means for storing a control signal for actuating said switching means; and means for applying a reset pulse to said storage circuit means whereby said switching means inhibits transmission of a signal from the respective tap of said delay line means.

8. The arrangement for correcting timing errors in a color television signal as defined in claim 1 including averaging means connected between said comparison means and said threshold circuit means for providing an average signal of the phase difference determined by said comparison means.

9. The arrangement for correcting timing errors in a color television signal as defined in claim 1 including rectifying means connected to the output of said comparison means for rectifying the output signal from said comparison means; and averaging means connected to said rectifying means and providing a signal representing the mean value of the rectified signal from said rectifying means, said signal representing said mean value being applied to said threshold circuit means.

10. An arrangement for correcting timing errors in a color television signal comprising, in combination, delay line means having an input end of receiving said color television signal and a plurality of taps from which said color television signal is emitted after predetermined time delays, each of said taps on said delay line means corresponding to a predetermined time delay differing from the time delays associated with the other taps of said delay line means; a plurality of signal processing circuit means each connected to one of said taps of said delay line means and including switching means for transmitting from the output of said signal processing circuit means the color television signal emitted by the tap of the delay line means to which the signal processing circuit means is connected; comparison means connected to the tap of said delay line means and having a reference signal applied to it for comparing the phase of the color television signal from said tap with the phase of said reference signal, said comparison means including a circuit for superimposing the color synchronizing signal in said color television signal and said reference signal with color subcarrier frequency; and threshold circuit means connected to said comparison means and providing an output signal only when the phase difference between said reference signal and said color television signal is below a predetermined level, whereby said switching means responding to said threshold circuit means transmits a signal emitted from a tap of said delay line means and having a desired phase relationship in comparison with said reference signal.

11. A method for reducing timing errors in a color television signal to a predetermined value, comprising the steps of delaying the color television signal by a plurality of different delay times, each delay time being not greater than twice the predetermined value to which the timing error is to be reduced; comparing the phase of the color synchronizing signal in the color television signal after each delay time with a reference signal with color sub-carrier frequency so as to produce a resultant signal of which the magnitude increases with increasing phase difference between the color synchronizing signal and the reference when the magnitude of the resultant signal is below a predetermined threshold level corresponding to a predetermined phase difference; and transmitting a delayed color television signal when this magnitude is below the predetermined threshold level.